Feb. 25, 1930.   F. C. MARTIN   1,748,490
X-RAY DENTAL FILM PACKAGE
Filed March 11, 1926
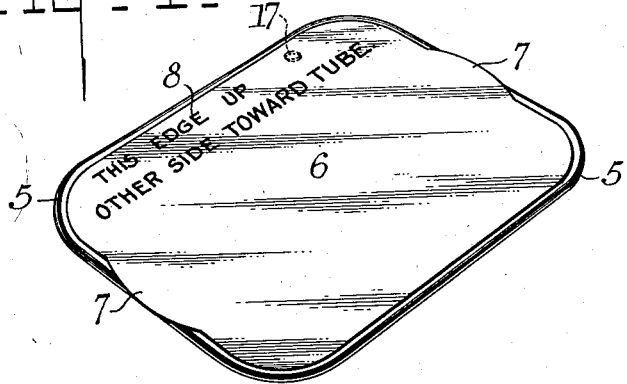
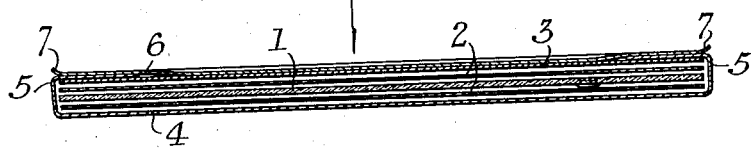
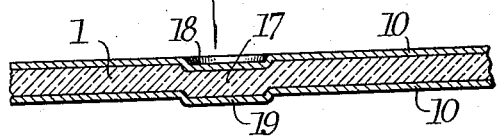
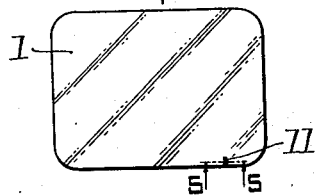
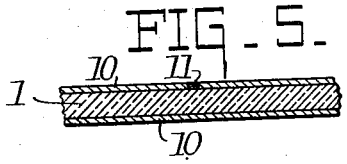
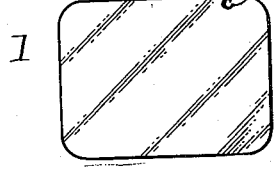
Frederick C. Martin,
INVENTOR,
BY
ATTORNEYS.

Patented Feb. 25, 1930

1,748,490

UNITED STATES PATENT OFFICE

FREDERICK C. MARTIN, OF ROCHESTER, NEW YORK, ASSIGNOR TO EASTMAN KODAK COMPANY, OF ROCHESTER, NEW YORK, A CORPORATION OF NEW YORK

X-RAY DENTAL FILM PACKAGE

Application filed March 11, 1926. Serial No. 93,963.

This invention relates to X-ray film packages and more particularly to means for identifying after development which side of the film was the one facing the X-ray tube. It is common to use film coated upon both surfaces both of which will have images formed in them, rendering it very difficult to identify from the appearance of the film which side of the film was the one facing the tube. This is particularly true in dental work where a set of exposures is made which are symmetrically taken around the jaw. It is then very easy to get the exposures of the right and left sides confused.

The film usually is furnished by the manufacturers in small packets ready to be used individually and each containing one or two sheets of film in a light tight container and with a designation upon the container to show which side should face the tube. I have improved such a package by placing upon the double-coated film sheet before its insertion in the package an identifying means which has a different aspect upon one surface than upon the other of the film. This is located in all packages with the same aspect toward that side of the package which is to face the X-ray tube area. It, therefore, furnishes a certain means of identifying the correct aspect of the exposure.

Reference will now be made to the accompanying drawings in which,—

Fig. 1 is a perspective view of a film package;

Fig. 2 is a section of such a package;

Fig. 3 is an enlarged fragmentary section of the film only showing the locating dimple;

Fig. 4 shows a film with a different form of locating means;

Fig. 5 is an enlarged fragmentary section on line 5—5 of Fig. 4;

Fig. 6 shows still a different embodiment of the film.

The type of package chosen to illustrate the preferred embodiment of my invention is similar to that disclosed in Patent No. 1,536,345, Jones, granted May 5th, 1925, for Dental X-ray film package. This comprises a film sheet 1 upon each side of which is a sheet of interleaving paper 2 and upon one side of which is a sheet of metal foil such as lead 3. These elements, which are all of the same size, are contained in an envelope or closure comprising a sheet 4 of light tight material such as black paper, which is of larger size than the included sheets and the borders of which are bent up over the edge of the contained sheets, as indicated at 5. A sealing sheet 6, which is also used as a label, is then placed upon the overturned edges 5 and attached thereto by adhesive. The ends of this sheet may have finger tabs 7 and there appears upon this suitable directions, as indicated at 8, as to which side of the package should face the tube. In practice this package may be assembled by machinery, which may be at least automatic in its operation and as the elements are assembled a film sheet 1 will have impressed therein a dimple 17. This will form a depression 18 upon one surface and a protuberance 19 upon the other. As has already been noted, there is a sensitive layer 10 upon each surface of the film. This dimple will also be positioned unsymmetrically of the edges so that the indication will show invariably which side of the film faces the tube, and which is the upper edge of the film.

In Figs. 4 and 5 is shown a different embodiment of my invention. In this instance a portion of the emulsion is removed in a definite pattern at a predetermined point from one side only of the film. Such a scratch or groove is indicated at 11. The film only is shown as the envelope would be the same as above described.

Still another method of making a positive indication on the film is shown in Fig. 6, where a developed film is shown having at a definite predetermined point thereon a character 12, which will be right side up and correctly positioned as to right and left only when viewed from a definite side of the film, when held in a certain position.

The first two described embodiments of my invention are perceptible to the senses of touch and sight, but it is to be noted that in each embodiment the aspect of the symbol is different from the opposite sides of the film.

Having thus described my invention, what I claim as new and desire to secure by Letters Patent is:

1. As an article of mnaufacture and sale, a dental X-ray film package comprising an unexposed film sheet sensitized on both surfaces and a light-tight wrapping for said sheet, said wrapping having indicating means positively differentiating one side from the other, and a definite indicating means borne by the film in a predetermined definite relation to the indicating means on the wrapping, whereby after exposure and development the two sides of the film may be distinguished but being otherwise identical in appearance.

2. A dental X-ray film package comprising a film sheet sensitized on both surfaces, a light tight wrapping for said sheet, said wrapping having indicating means for positively differentiating one side from the other and means on the surface of the film, perceptible by the sense of touch, whereby the two surfaces of the film, after exposure and development, will be perceptibly different by the sense of touch but otherwise identical in appearance, said means having a predetermined definite relation to the indicating means on the wrapping.

3. A dental X-ray film package comprising a film sheet sensitized on both surfaces, a light tight wrapping for said sheet, said wrapping having indicating means for positively differentiating one side from the other, and a protuberance on one surface of the film having a predetermined definite relation to said indicating means on the wrapping, whereby after development and exposure the two surfaces of the film may be distinguished but being otherwise identical in appearance.

Signed at Rochester, New York, this 10th day of March, 1926.

FREDERICK C. MARTIN.